April 27, 1943.   E. L. MACK   2,317,787
FASTENER
Filed April 18, 1942

INVENTOR.
Edward L. Mack
BY
Geo. C. Shoemaker

Patented Apr. 27, 1943

2,317,787

UNITED STATES PATENT OFFICE 2,317,787

FASTENER

Edward L. Mack, New York, N. Y.

Application April 18, 1942, Serial No. 439,465

9 Claims. (Cl. 24—221)

This invention relates generally to a new and improved fastening device adapted for detachably fastening together two separate parts or sheets of material, and the invention particularly relates to an improved airplane cowl fastener, or fastener adapted to serve in a related manner for holding readily detachable sheet metal parts in close proximity under spring tension, with the provision of predetermined travel limit means.

Particularly, my invention relates to an improvement in respect to that class of fastening device described and claimed in Letters Patent #1,955,740 issued April 24, 1934, to William Dzus wherein two parts are held together under spring tension by virtue of a spirally tracked tubular rotatable stud member and a cooperative resiliently mounted cross-bar locking member. My invention involves substantially improving this class of fastener by adding thereto a definitely sensitive travel limit means, preferably by forming the same integrally with the resilient cross-bar member, thereby preventing any collapse of the fastener due to a deformation of the cross-bar beyond its elastic limit, or alternatively, preventing a too wide separation of the plate members which it is sought to join together in closely adjacent relationship under spring tension.

An object of the invention is to provide a fastener of this type which has a minimum of parts, which is economical to manufacture and to assemble, and which is easily susceptible of critical travel limit adjustments in the process of manufacture, thus giving desired optimum results in both manufacture and use.

With the above and other objects in view, my invention will be readily understood from a preferred illustrative embodiment hereinafter described in connection with the accompanying drawing which, it is to be understood, is not to be deemed as limiting the scope of my invention.

In the figures:

Fig. 1 is a cross section of a fastener embodying my invention with the parts in interlocked position.

Fig. 2 is a section similar to Fig. 1 of an alternate embodiment of my invention with the fastener parts in interlocked position.

The embodiment of my invention shown in Fig. 1, is an improvement upon that fastening device described and claimed in Dzus Patent #1,955,740 above identified, and Fig. 1 may be said to diagrammatically illustrate the connection of two plate members 10 and 12 which is desired to hold in close proximity and relatively fixed position under spring tension by means of a fastener or coupling generally indicated as 14.

The fastener 14 comprises two main parts namely a rotatable stud member 16 and a cooperative cross-bar member 18 which is normally relatively stiff but is resiliently and integrally mounted at its ends to coil springs 20 and 22 and is positioned over and across opening 23 in plate 12. Stud member 16 is joined to plate member 10 by grommet 24 which rides in a reduced portion 25 of stud 16 and cross-bar member 18 is joined to plate member 12 by rivets 26. If desired, a grommet 24a may be positioned on plate member 12 and plates 10 and 12 may be, as indicated, slightly separated by blocks 28 which are united to plate 12 by virtue of rivets 26.

As described in the above identified Dzus Patent #1,955,740 the tubular rotatable stud is arranged by virtue of its spiral tracks 30 and its detent 32 to interlock the resiliently mounted cross-bar member 18 by virtue of approximately one quarter of a clockwise turn, thus uniting plates 10 and 12 under spring tension and placing cross-bar 18 in detent 32. Counter-clockwise turning of the stud releases cross-bar 18 from detent 32.

Additionally, in order to limit the separation of plate members 10 and 12 and to permit the use, if desired, of somewhat lighter stock, cross-bar member 18 in Fig. 1, is integrally provided with a travel limit means which comprises two turn-backs or transverse folds 34 and 36 respectively in the bar, and which, dependent upon the amount of the turn-back, critically determine the amount of deflection possible in the resiliently mounted cross-bar 18 before the travel limit means or folds 34 and 36 impinge upon the plate 12, thus thereafter giving a connection between plates 10 and 12 which is substantially inflexible in its parts.

Therefore it will be understood I have disclosed that by a proper shaping of the spring cross-bar member 18, an integral part thereof may be arranged to impinge upon plate 12, under stress, and thus provide a travel limit means restricting the relative movement of the spring mounted member 18 and the plate 12.

In Fig. 2, wherein common parts above described are given common numerals the fastener operates in a precisely similar fashion and precisely similar parts, except that integral travel limit means or folds 34 and 36 are replaced as indicated by a circular tubing member 38 which is positioned upon cross-bar member 18 and there preferably swaged in fixed relation or position as at 38a. This form of travel limit means I have found strong and economical and easy to place in position. Alternate to tubing it is obvious that two individual collar means or travel limit stop means of a metal washer or square block type might be utilized.

It will be recognized that the embodiments of my invention above described are illustrative only and that substitutions of materials and parts, or reversals of parts may be made without avoiding the scope of my invention which is defined in the following claims.

What I claim is:

1. A fastener for detachably fastening two parts together comprising a slotted spiral tracked stud member rotatably mounted on one of such parts and a resiliently mounted cross-bar disposed across an opening in the second of said parts and transverse to said stud member and adapted to cooperate with said stud member to unite the two parts in close proximity under spring tension and travel limit means connected to said cross-bar adapted to limit its travel longitudinally in respect to said stud member.

2. A fastener for detachably fastening two parts together comprising a slotted spiral tracked stud member rotatably mounted on one of such parts and a resiliently mounted cross-bar disposed across an opening in the second of said parts and transverse to said stud member and adapted to cooperate with said stud member to unite the two parts in close proximity under spring tension and travel limit means comprised of two integral folds in said cross-bar member adapted to limit the travel of said cross-bar longitudinally in respect to said stud member.

3. A fastener for detachably fastening two parts together comprising a slotted spiral tracked stud member rotatably mounted on one of such parts and a resiliently mounted cross-bar disposed across an opening in the second of said parts and transverse to said stud member and adapted to cooperate with said stud member to unite the two parts in close proximity under spring tension and travel limit means which include a tubular ring member connected to said cross-bar member adapted to limit the travel of said cross-bar member longitudinally of said stud member.

4. A fastener for detachably fastening two parts together comprising a slotted spiral tracked stud member rotatably mounted on one of such parts and a resiliently mounted cross-bar disposed across an opening in the second of said parts and transverse to said stud member and adapted to cooperate with said stud member to unite the two parts in close proximity under spring tension and relatively inflexible travel limit means connected to said cross-bar adapted to limit its travel longitudinally in respect to said stud member.

5. The combination with two parts to be fastened together of a fastening device comprising a spring member secured to one of said parts and said part having an opening therein across which said member extends, a slotted spiral tracked stud rotatably connected with the other of said parts, the construction and arrangement being such that the stud may be engaged with said spring member to fasten said parts together, and travel limit means connected to said spring member adapted to limit its travel longitudinally in respect to said stud member.

6. In a fastening device the combination with a part to be fastened of a stud rotatably connected with said part, said stud having at least one slotted spiral track in the wall thereof positioned to receive a cooperative resiliently mounted cross-bar, and travel limit means associated with said cross-bar adapted to limit the travel of the cross-bar longitudinally in respect to said stud.

7. A fastening comprising the combination with parts to be fastened together, one of said parts having an opening therein, of a fastening element consisting of an intermediate straight section, and coils formed respectively on the opposite ends of said straight section, means on the part having said opening engageable with said coils to secure the element on said part with the straight section disposed transversely of said opening, slotted turnable means carried by the other of said parts passing through said opening and engageable with said straight section by turning said last means to detachably fasten said parts together and travel limit means associated with said fastening element adapted to limit its travel longitudinally in respect to said turnable means.

8. A fastener for detachably fastening two parts together comprising a slotted spiral tracked stud member rotatably mounted on one of such parts and a resiliently mounted cross-bar disposed across an opening in the second of said parts and transverse to said stud member and adapted to cooperate with said stud member to unite the two parts in close proximity under spring tension and travel limit means comprising two integral folds of the cross bar and which include two portions of said cross-bar bent inwardly towards said second part adapted to impinge upon a relatively inflexible part of the assembly thereby to limit the travel of said cross-bar longitudinally in respect to said stud member.

9. In a fastener for detachably fastening two parts together and which includes a spiral tracked stud member adapted to be rotatably mounted on the first of said parts and a resiliently mounted cross-bar adapted to be disposed across an opening in the second of said parts and transverse to said stud member, and to cooperate with said stud member to unite the two parts in close proximity under spring tension; travel limit means which include two integral portions of said cross-bar bent inwardly and adapted to impinge upon a relatively inflexible part of the assembly thereby to limit the travel of said cross-bar longitudinally in respect to said stud member.

EDWARD L. MACK.